United States Patent Office 3,530,491
Patented Sept. 22, 1970

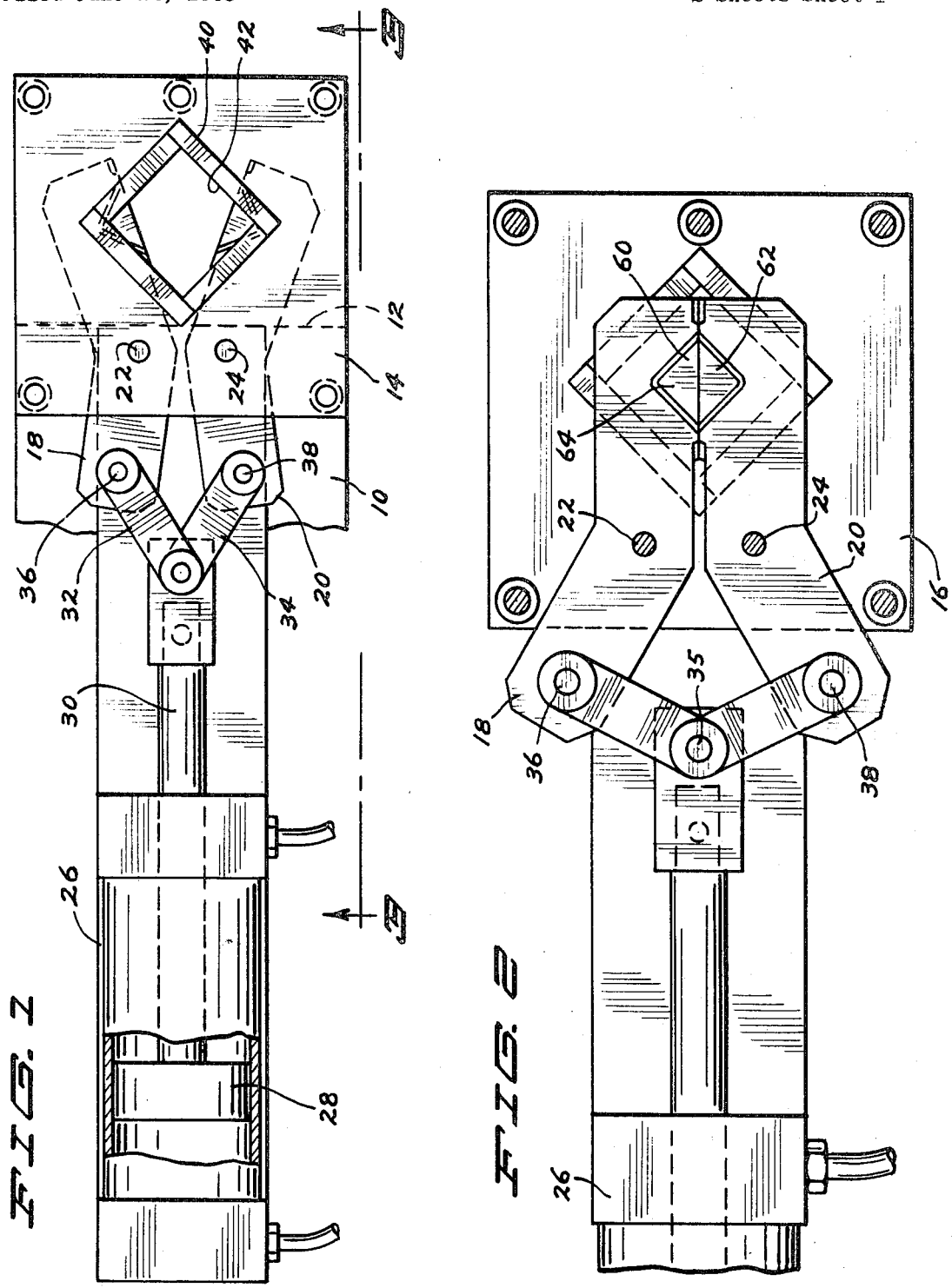

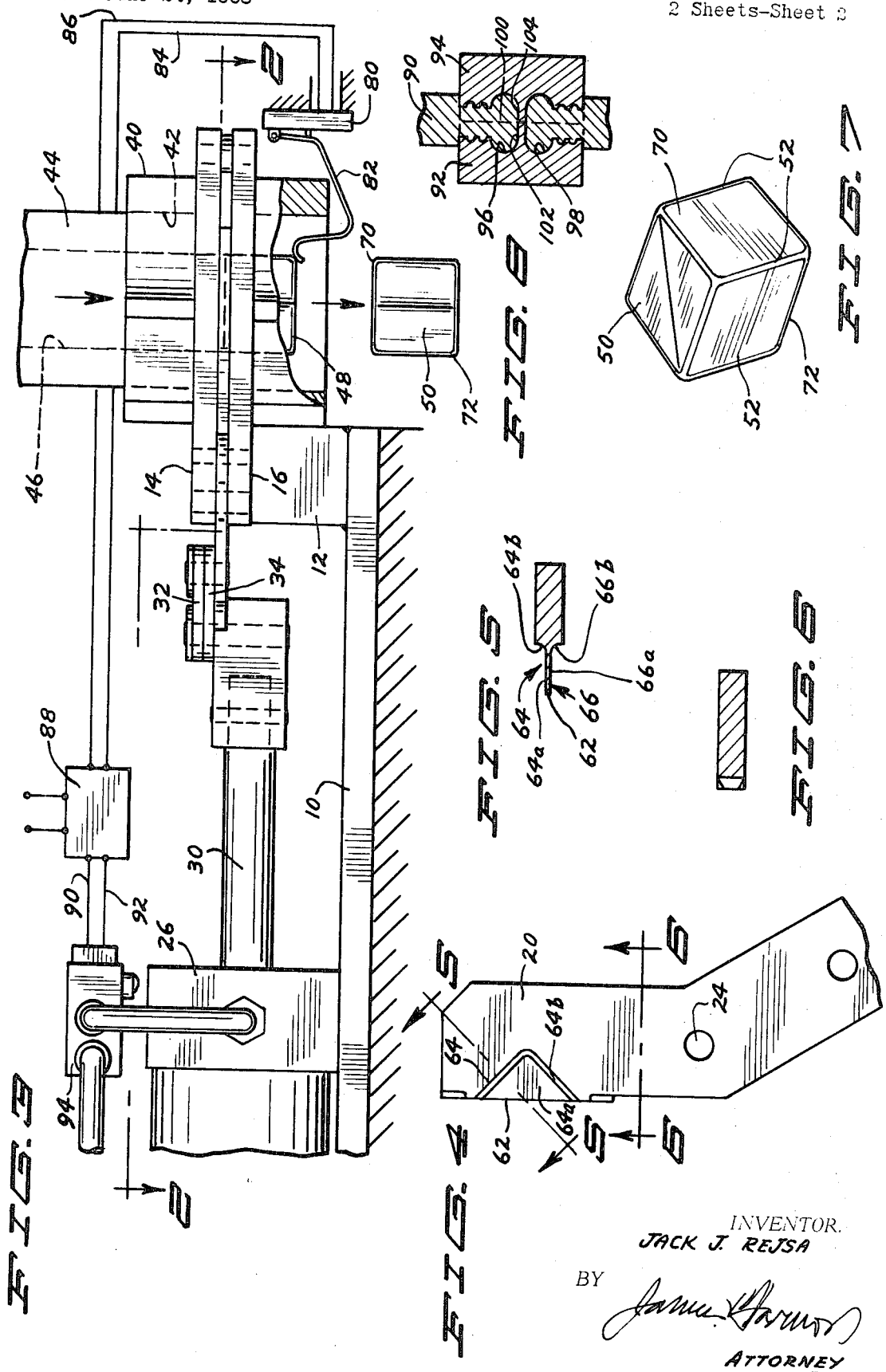

3,530,491
APPARATUS FOR FORMING FOOD PIECES
Jack J. Rejsa, Minneapolis, Minn., assignor to The Pillsbury Company, Minnneapolis, Minn., a corporation of Delaware
Filed June 24, 1968, Ser. No. 739,333
Int. Cl. A21c *11/10*
U.S. Cl. 107—69                                          7 Claims

ABSTRACT OF THE DISCLOSURE

Prior equipment for cutting off extruded food products such as food bars and candy bars produce sharp or jagged corners which do not present an attractive appearance. Moreover, small pieces tend to break off these sharp corners. This problem is avoided by simultaneously forming the ends of the extruded material as it is cut by means of a forming die located on both the upper and lower surface of the scissors. When the scissors are in a closed position, each die has the form of a cup or pocket bisected by the line of contact between the sharpened edge of the scissors. The bottom of the pocket in each case is parallel with the plane through which the scissors move. The pocket can be square, cylindrical or of other suitable shape. Curved side walls round off the corners of each piece as it is cut.

---

The present invention relates to food extrusion and more particularly to equipment for cutting and forming extruded food products. Food products which are formed by extrusion including food bars, snacks, candy bars and related confectionary food products are usually cut at uniformly spaced intervals as they are extruded. If later shaped in a mold, the pieces must be transferred from the extruder to a molding die where they are pressed to the desired shape. Equipment for transferring the material effectively is relatively expensive to build and operate.

In the event the extruded pieces are not subsequently placed in a mold to form them to the desired shape, they will usually have relatively sharp or jagged edges at the cut surface. This can be particularly troublesome in the event the appearance of the food product is important or in applications in which pieces must not break away from the cut edges. Although the present invention is applicable to formation of food products in general, it is particularly useful in connection with food products that are to be used under zero gravity conditions in space exploration. In this environment it is especially important to prevent small pieces of the food product from breaking off and floating about the cabin.

In view of the deficiencies of the prior art it is one object of the present invention to provide an improved apparatus for simultaneously cutting and forming extruded food pieces.

Another object is to provide an improved cutting apparatus for severing extruded food material at uniformly spaced intervals and for rounding and compressing the cut edges of the food pieces to thereby provide round edges on each piece.

Another object is to provide an improved food cutting and forming apparatus of the type described which will reliably operate for extended periods of time without becoming fouled by the food product being cut.

A still further object of the invention is the provision of an improved food cutting and forming apparatus wherein extrusion can be carried out continuously without the build-up of excessive pressure in the extruded material as it is cut.

Another object of the invention is the provision of an improved extruded food cutting device in which a single cylinder can be employed for moving a pair of cooperating cutting and forming elements.

A further object of the invention is the provision of an improved apparatus for extruding and forming food material to a desired cross sectional shape, for sensing the length of the extruded material and for cutting and forming the extruded material when a predetermined length of material has been extruded.

A further object of the invention is the provision of an improved cutting apparatus of the type described which can be used for cutting a food piece and simultaneously forming the end to an ornamental shape.

These and other more detailed and specific objects of the invention will be apparent in view of the following specification and drawing wherein:

FIG. 1 is a plan view of an apparatus embodying the invention partly in section.

FIG. 2 is a partial plan view of the cutting knives or scissors on a somewhat enlarged scale relative to FIG. 1.

FIG. 3 is a side elevational view partly in section taken on line 3—3 of FIG. 1 on a somewhat enlarged scale.

FIG. 4 is a plan view of one of the scissor elements partially broken away.

FIG. 5 is a cross sectional view of one of the scissor elements taken on line 5—5 of FIG. 4 on a somewhat enlarged scale.

FIG. 6 is a cross sectional view taken on line 6—6 of FIG. 4.

FIG. 7 is a perspective view of one of the food pieces prepared with the apparatus of FIGS. 1–6.

FIG. 8 is a vertical cross sectional view taken through a pair of scissors in accordance with another form of the invention when in the process of forming a pair of extruded adjacent food pieces.

Briefly stated, the present invention provides a pair of cooperating cutting elements mounted for movement between open and closed positions and having adjacent cutting edges adapted to contact each other when in the closed position. A forming pocket bisected by the cutting edges is located on at least one surface of the cutting elements to engage and compress the side surfaces of the extruded food material as it is cut. In a typical application, the food product is extruded through a square opening in which the intersecting edges of each die face are rounded to a 1/16 inch radius. The upper and lower edges of the extruded cubes are also rounded by the forming pocket to a 1/16 inch radius. The combined cutter and end forming die is opened and closed rapidly as extrusion proceeds without interruption.

To the accomplishment of the foregoing and related ends the invention then comprises the features hereinafter fully described and particularly pointed out in the claims, the following description setting forth in detail certain illustrative embodiments of the invention, these being indicative, however, of but a few of the various ways in which the principles of the invention may be employed.

As seen in FIG. 1, a supporting framework composed of horizontal plate 10 has secured to it a mounting block 12. To the mounting block 12 are fastened two horizontally disposed vertically spaced guide plates 14 and 16 between which scissor elements 18 and 20 are mounted for pivotal movement upon pins 22 and 24. The scissor elements 18 and 20 are moved between the open position of FIG. 1 and the closed position of FIG. 2 by a quick-acting actuator such as a pneumatic cylinder 26 which includes the usual piston 28 (FIG. 1) connected by means of a piston rod 30 and pivot pin 35 to links 32 and 34 which are pivoted by pins 36 and 38 to the free ends of the scissor elements. Secured to the upper surface of the plate 14 is a die holder 40 provided with a rectangular vertically disposed opening 42 into which projects the lower free end of the food extrusion die 44 (FIG. 3). The die is provided with a bored die opening 46 of rectangular cross section. It is through the opening 46 that the food product 48 is extruded and cut as described below to provide a plurality of food pieces 50.

Each intersection between the side walls of the opening has a 1/16 inch radius to give each cube a rounded edge.

The cutting and forming blades will now be described in connection with FIGS. 2, 4, 5 and 6. The cutting blades 18 and 20 are provided with relatively thin cutting edges 60 and 62 respectively, which when the blades are in the closed position abut against one another as they cut the extruded material 48 into a plurality of pieces 50. Each of the blades 18 and 20 of FIG. 2 is provided on its upper and lower surface with one-half of a pocket 64 and 66 respectively, each of which is a rectangular outline. The pocket 64 has a flat bottom wall 64a and side wall having a curved side wall 64b. Pocket 66 has a flat bottom 66a and a curved side wall 66b. It is the curved walls 64b which act as a forming die to compress the extruded pieces 50 at their edges to define upper and lower curved edges 70 and 72 respectively.

While the operation of the apparatus can be actuated in a number of ways, it is conveniently controlled by placing a micro-switch 80 in the proper position to locate its sensing arm 82 (FIG. 3) just beneath the extrusion orifice whereby contact between the extruded material 48 and the sensing arm 82 will send an electrical pulse through lines 84 and 86 to a controller 88 which in turn will supply a current through conductors 90 and 92 to a solenoid operated valve 94. Valve 94 acts to supply air to the cylinder 26 thereby driving the piston 28 for a brief instant to the right in the figures, thus moving the scissor elements 18 and 20 to the closed position (FIG. 2) thereby severing the extruded pieces at uniformly spaced intervals and simultaneously forming their upper and lower ends so as to provide rounded edges at 70 and 72.

As seen in FIG. 8, a food product 90 is expelled from an extruder (not shown) in a downward direction and is simultaneously cut and formed by means of scissor elements 92 and 94 which include upper and lower cavities 96 and 98 or forming dies. The cavities are divided along a vertical separation line 100. Between the cavities are relatively thin cutting flanges 102 and 104 that sever the extruded material 90 at uniformly spaced intervals. It can be seen during operation as the scissor elements 92 and 94 approach one another they simultaneously cut the pieces apart and form their ends.

It is apparent that many modifications and variations of this invention as hereinbefore set forth may be made without departing from the spirit and scope thereof. The specific embodiments described are given by way of example only and the invention is limited only by the terms of the appended calims.

I claim:
1. An apparatus for forming and cutting food material comprising in combination extrusion means for continuously expelling a strip of food material, cutting and forming means mounted at the otulet of the extrusion means, said cutting and forming means comprising co-operating scissor elements mounted in a plane intersecting the strip of food material as it is expelled from the extruder, said scissor elements being movable within said plane between a closed position in which the adjacent edges are in contact and an open position in which said adjacent edges are spread far enough apart to allow the extruded material to pass therebetween, energizing means connected to the scissor elements for moving the scissor elements between the open and closed positions, each of the scissor elements including a portion of at least one pocket on a surface of the scissor elements parallel to the said plane of movement, said pocket being bisected by the line of contact between said adjacent edges of the scissor elements, said pocket having side walls of a predetermined shape and size adapted to compress and form at least the end portion of the extruded material into a predetermined configuration as it is cut.

2. The apparatus of claim 1 wherein a sensing means is positioned adjacent the scissor elements for detecting the presence of extruded material and means operatively associated between the energizing means of the sensing means for operating the energizing means to move the scissors towards the closed position when the material is detected by the sensing means.

3. The apparatus of claim 1 wherein the pocket is generally rectangular as seen in plan view and the side walls of the pocket have a predetermined curvature to form rounded edges on the pieces as they are cut.

4. The apparatus of claim 1 wherein the pocket comprises a cavity having a flat bottom wall in said plane of movement of the scissor elements and side walls having a predetermined radius of curvature to provide rounded edges on the pieces of material being cut when the scissors are energized.

5. The apparatus of claim 1 wherein two pockets are provided, one such pocket being located on each surface of the scissor elements, each such pocket being bisected by the line of contact between adjacent edges of the scissor elements when the scissor elements are in the closed position.

6. The apparatus of claim 1 wherein a sensing means is positioned adjacent the scissor elements for detecting the presence of an extruded material and means is operatively associated between the energizing means of the sensing means for operating the energizing means to move the scissors towards the closed position when the material is sensed by the sensing means, the side walls of the pocket having a predetermined curvature to form rounded edegs on the pieces as they are cut.

7. The apparatus of claim 1 wherein the pocket has a predetermined curvature to form rounded edges on the pieces as they are cut, the pocket comprising a cavity having a flat bottom wall in the plane of movement of the scissor element, two such pockets being provided, one being located on each side of the scissor element and each being bisected by the line of contact between adjacent edges of the scissor elements when the scissor elements are in the closed position.

References Cited
UNITED STATES PATENTS

| | | | |
|---|---|---|---|
| 1,639,122 | 8/1927 | Whitman. | |
| 2,915,957 | 12/1959 | Bowman | 99—238 |
| 2,926,557 | 3/1960 | Ford | 107—69 XR |
| 3,270,692 | 9/1966 | Cummins | 107—68 |
| 3,291,032 | 12/1966 | Graves | 99—238 |

WILLIAM I. PRICE, Primary Examiner

A. O. HENDERSON, Assistant Examiner

U.S. Cl. X.R.

17—32; 107—16